United States Patent [19]

Schmitt

[11] Patent Number: 4,601,520
[45] Date of Patent: Jul. 22, 1986

[54] PRESSURE REGULATING VALVE FOR AN HYDRAULIC VEHICLE BRAKING SYSTEM

[75] Inventor: Gerd Schmitt, Mayen, Fed. Rep. of Germany

[73] Assignee: Lucas Industries, Birmingham, England

[21] Appl. No.: 541,509

[22] Filed: Oct. 13, 1983

[30] Foreign Application Priority Data

Nov. 22, 1982 [DE] Fed. Rep. of Germany ....... 3243053

[51] Int. Cl.$^4$ .................. B60T 13/00; B60T 8/00
[52] U.S. Cl. .................. 303/6 C; 303/24 F
[58] Field of Search .......... 303/24 R, 24 A, 24 F,
303/24 C, 6 C, 84 R; 188/349, 151 A; 137/152, 38

[56] References Cited

U.S. PATENT DOCUMENTS

| 3,319,742 | 5/1967 | Cumming | 303/84 R |
| 3,572,845 | 3/1971 | Johannesen | 303/84 R |
| 4,080,006 | 3/1978 | Nogami et al. | 303/24 F |

Primary Examiner—Bruce H. Stoner, Jr.
Assistant Examiner—Alvin Oberley
Attorney, Agent, or Firm—Scrivener Clarke Scrivener and Johnson

[57] ABSTRACT

The invention relates to a pressure regulating valve for an hydraulic vehicle braking system, comprising a housing which has a main cylinder connection and an inlet chamber connected therewith, as well as a wheel cylinder connection and an outlet chamber connected therewith. A piston is arranged between the two chambers and normally leaves open a connection between them. A valve member is adapted to be moved when a certain deceleration force acting upon it is exceeded into a closed position in which it interrupts the connection between the two chambers. Thereupon, when pressure in the inlet chamber continues to increase, the piston enlarges said inlet chamber at the expense of the outlet chamber. A throttle member is arranged in the outlet chamber and normally leaves open the wheel cylinder connection but is adapted to be moved by the flowing brake fluid on sudden brake actuation into a position in which it partially covers the wheel cylinder connection. In this way, when the brake fluid flows too rapidly on sudden actuation of the main cylinder, the brake fluid itself causes its own path to the wheel cylinder connection to be partially blocked, thus preventing an excessively abrupt pressure increase in the—or each of the—connected wheel cylinders.

8 Claims, 4 Drawing Figures

PRESSURE REGULATING VALVE FOR AN HYDRAULIC VEHICLE BRAKING SYSTEM

The invention relates to a pressure regulating valve for an hydraulic vehicle braking system, comprising
a housing which has a main cylinder connection and an inlet chamber connected therewith, as well as a wheel cylinder connection and an outlet chamber connected therewith,
a piston which is arranged between the two chambers and normally leaves open a connection between them, and
a valve member which is adapted to be moved when a certain deceleration force acting upon it is exceeded into a closed position in which it interrupts the connection between the two chambers,
whereupon, when pressure in the inlet chamber continues to increase, the piston enlarges said inlet chamber at the expense of the outlet chamber.

In a known pressure regulating valve of this genus (DE No. 2 213 463 C3), the piston is a stepped piston, defines the outlet chamber with its larger end face, and is biased by a spring in such a manner that it normally abuts a front stop which is formed within the outlet chamber on the housing. The connection between the two chambers is formed by an axial canal in the piston whose end facing the inlet chamber is surrounded by an annular valve seat. The valve member is spherical and is movable within the inlet chamber on a course inclining in forward direction with respect to the vehicle when the pressure regulating valve is in installation position. When the vehicle is at a standstill or in uniform motion, the valve member under the influence of its own weight abuts a rear stop and is thus kept remote from the valve seat. When deceleration of the vehicle on braking exceeds a certain level, the valve member rolls in forward and upward direction due to its inertia against a central stop which is arranged in the housing such that the valve member cannot reach the valve seat as long as the piston under the influence of the spring abuts the front stop. However, when the pressure of the brake fluid in the inlet chamber and—due to the still open connection through the piston, also in the outlet chamber—exceeds a certain level, the piston moves against the resistance of the spring in rearward direction so that the valve seat joins up with the valve member. Thus, this known brake pressure regulating valve only closes when a certain pressure has built up in the outlet chamber and thus in the connected wheel cylinders also. When pressure in the inlet chamber further increases, the piston moves in forward direction again so that the valve seat temporarily distances itself from the valve member, thus making possible a further increase in pressure in the outlet chamber, although only to an extent which is reduced in comparison to the increase in pressure in the inlet chamber proportionate to the end faces of the piston.

This method of operation of the known pressure regulating valve is completely satisfactory under normal conditions. However, on sudden and very violent actuation of the main cylinder, the piston is prevented by its own inertia and by the very rapid build-up of pressure in the inlet chamber, as well as the flow forces of the brake fluid from moving in time into a position in which the valve member can reach the valve seat. This can have the result that a sudden pressure increase is propagated up to the connected wheel cylinders and causes the associated wheel brakes to lock. As this is usually a case of rear-wheel brakes, the locking condition will not be overcome even when the valve finally closes as by this time, due to the deceleration of the vehicle, more or less a large part of its weight has been displaced from the rear wheels to the front wheels so that the road grip of the rear wheels is reduced.

Another pressure regulating valve of the genus described at the beginning, which counters locking of the connected rear wheels during particularly rapid actuation of the main brake cylinder is known from DE No. 1 780 644 C3. It does so due to the fact that the brake fluid is lead from the main cylinder of the inlet chamber through a nozzle directed at the valve member thus forming a jet which tends to press the valve member against the valve seat. However, if this jet is very powerful, it can cause a premature closing of the valve and thus prevent sufficient initial pressure being achieved in the connected wheel cylinders.

It is therefore an object of the invention to construct a deceleration-conscious pressure regulating valve for an hydraulic vehicle braking system such that particularly violent surges of pressure be kept remote from the connected wheel cylinders while permitting a desirably abrupt pressure increase in these wheel cylinders during an initial phase of brake actuation.

This object is met according to the invention in a pressure regulating valve of the genus described at the outset in that a throttle member is arranged in the outlet chamber and normally leaves open the wheel cylinder connection but is adapted to be moved by the flowing brake fluid on sudden brake actuation into a position in which it partially covers the wheel cylinder connection.

In this way, when the brake fluid flows too rapidly on sudden actuation of the main cylinder, the brake fluid itself causes its own path to the wheel cylinder connection to be partially blocked, thus preventing an excessively abrupt pressure increase in the—or each of the—connected wheel cylinders.

Preferably, the throttle member is arranged such that its weight tends to hold it in its normal position in which it leaves the wheel cylinder connection open. Alternatively or in addition, the throttle member could normally be held away from the wheel brake cylinder connection by a small spring.

In a preferred embodiment of the invention, the throttle member is an essentially circular disc whose diameter is smaller than the diameter of the outlet chamber but greater than the greatest axial length of said outlet chamber. The throttle member can also have another form, however - for example, that of a small sphere which is received with the necessary movability in a cage or an antechamber in front of the wheel cylinder connection.

If the throttle member is a disc, then it is also expedient if it has projections which prevent it from sealingly abutting the housing or the piston. However, corresponding projections can also be arranged on the housing and on the piston.

An embodiment of the invention is described in the following with reference to diagrammatic drawings showing further details, in which.

Figure 1:
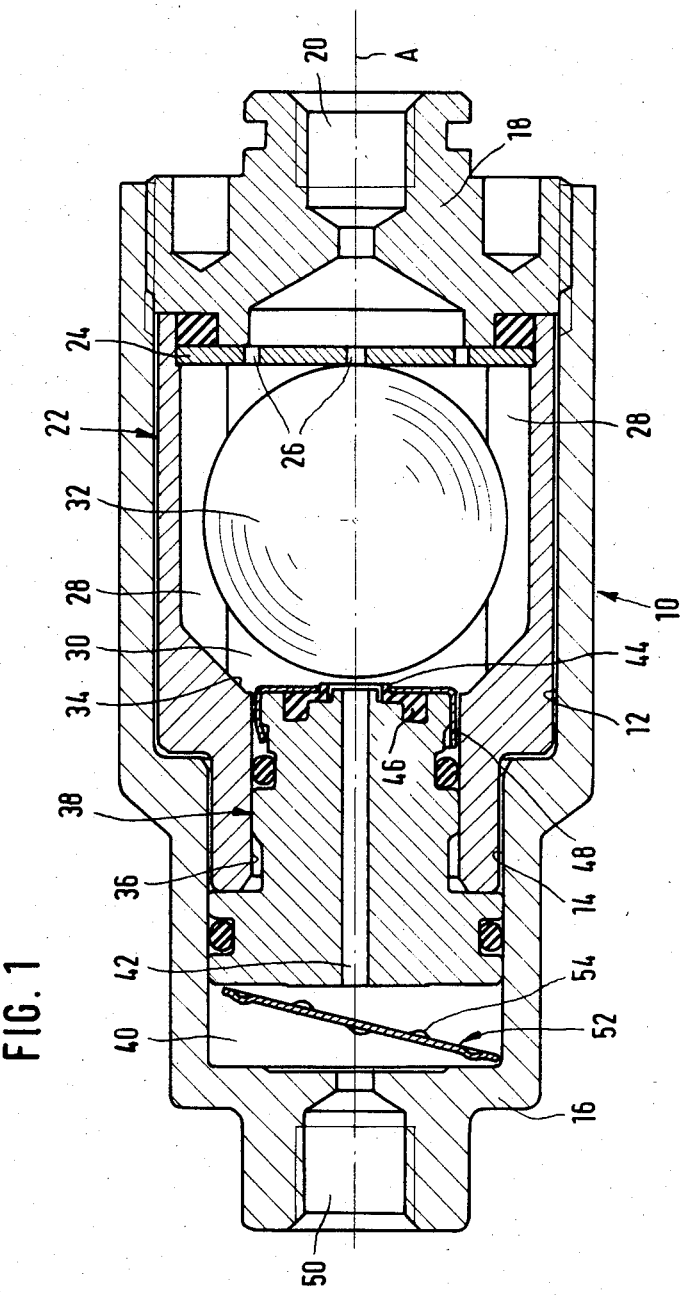
FIG. 1 is an axial section through a first pressure regulating valve in its inoperative position.
Figure 3:
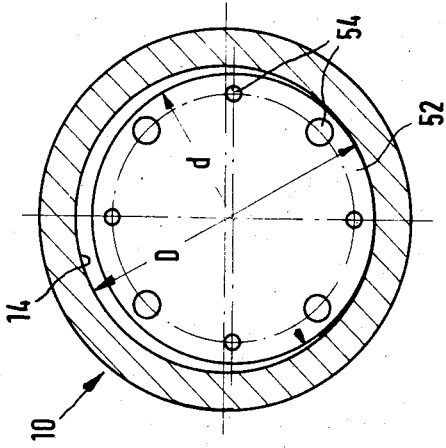
FIG. 3 is cross-section III—III of FIG. 2
Figure 2:
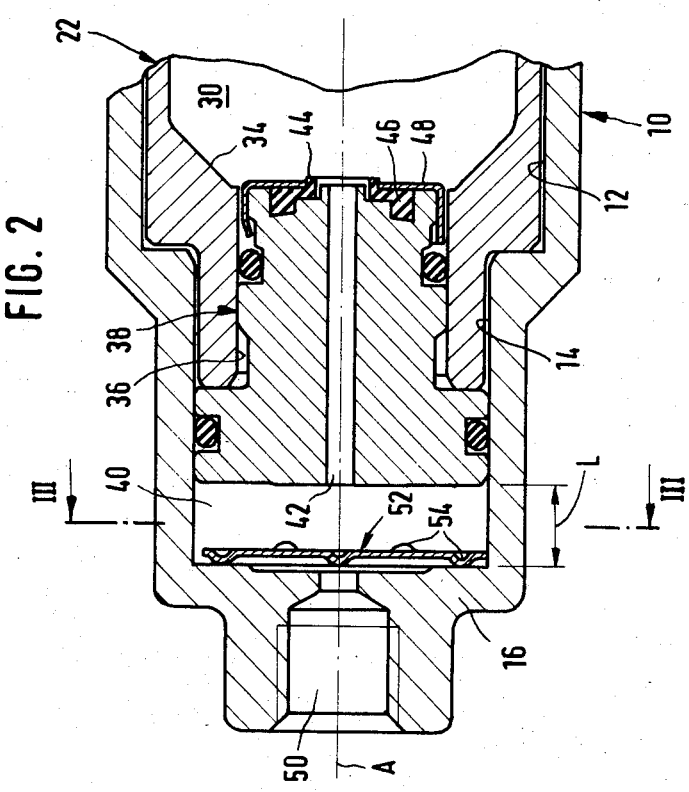
FIG. 2 is the front portion of the same pressure regulating valve, likewise in axial section, but at the beginning of an intermittent brake actuation.

The pressure regulating valve shown in FIGS. 1 to 3 has an axially symmetrical stepped cylindrical housing 10 which is installed in a vehicle such that its axis A is arranged in or parallel to the longitudinal central plane of the vehicle and inclined slightly in forward direction. The housing has a rear bore portion 12 of larger diameter and a front bore portion 14 of smaller diameter as well as a front end wall 16. At the rear, the housing is closed by a screwed-in plug 18; this has an axially arranged main cylinder connection 20 via which the pressure regulating valve is connected to a main cylinder of a vehicle braking system.

The plug 18 holds a stepped cylindrical insert 22 and a disc-shaped diaphragm 24 in the housing 10. The diaphragm 24 has several nozzle-like holes 26 one of which is arranged axially and the remaining ones are arranged at equal distances around the axis A.

Within the insert 22 and between coaxially arranged ribs 28, an inlet chamber 30 is formed which receives a spherical valve member 32 and is defined at the front by an annular shoulder 34. An axial cylinder bore 36 in the front portion of the insert 22 joins up with the shoulder 34. The diameter of the cylinder bore 36 is smaller than the diameter D of the front bore portion 14. In the cylinder bore 36 and in the front bore portion 14, corresponding portions of a stepped piston 38 are guided, said piston defining an outlet chamber 40 with its larger end face within the front bore portion 14.

An axial canal 42 extends through the piston 38 as connection between the inlet chamber 30 and the outlet chamber 40 and the end of said axial canal facing the inlet canal is surrounded by a valve seat 44. The valve seat 44 is formed on an annular elastomeric member 46 which is secured by a metal cap 48 at the rear end of the piston 38.

The front end wall 16 of the housing 10 has an axial wheel cylinder connection 50 via which the pressure regulating valve in assembled condition is connected with a cylinder of one or more wheel brakes. Generally, these are exclusively rear-wheel brakes; the front-wheel brakes of the vehicle are directly supplied with brake fluid by the main cylinder. A throttle member 52 is floatingly arranged in the outlet chamber 40 as an obstacle to flow between the canal 42 and the wheel cylinder connection 50 aligned therewith.

In the example shown, the throttle member 52 is formed from a circular disc made of sheet metal, its diameter d being rather smaller than the diameter D of the outlet chamber 40, but considerably larger than its greatest possible length L.

The outlet chamber 40 has its greatest possible length L in the shown normal position of the piston 38 in which said piston 38 supports itself on the front end of the insert 22. Here, the throttle member 52 usually assumes the sloping position shown in FIG. 1 in which it supports itself above on the front end surface of the piston 38 and below in the angle between the front bore portion 14 and the end wall 16 of the housing 10.

On both sides of the throttle member 52, near its edge, mammilated projections 54 are formed offset from each other at regular angular distances so that the throttle member cannot sealingly abut either the end wall 16 of the housing 10 or the front end face of the piston 38.

When the main cylinder connected to the described pressure regulating valve is actuated normally, brake fluid flows at moderate speed through the main cylinder connection 20 and then through the holes 26 in the diaphragm 24 into the outlet chamber 30 from which it flows through the axial canal 42 of the piston 38 into the portion of the outlet chamber 40 situated behind the throttle member 52. The brake fluid issuing from the canal 42 has only a moderate speed of flow and can therefore only exert a correspondingly weak impulse on the throttle member 52 so that the latter retains at least approximately the position shown in FIG. 1. The brake fluids flows substantially unhindered through the approximately crescent-shaped gap between the edge of the throttle member 52 and the wall of the front bore portion 14 to the wheel cylinder connection 50 and from there on to the cylinders of the connected wheel brakes.

When the vehicle has achieved a certain deceleration as a result of braking effected in this way, the spherical valve member 32 rolls on the lower ribs 28 in forward direction and joins up with the valve seat 44 thus causing the connection between inlet canal 30 and outlet canal 40 to be interrupted. When the pressure in the inlet chamber 30 increases again, the pressure in the outlet chamber 40 remains constant at first until the product of the pressure in the inlet chamber 30 and the surface area of the rear end surface of smaller diameter of the piston 38 is greater than the product from the pressure in the outlet chamber 40 and the surface area of the front larger end face of the piston 38. The piston 38 is then displaced in forward direction causing the pressure in the outlet chamber 40 to increase, although to a lesser degree than in the inlet chamber 30, proportionate to the ratio of the end faces of the piston 38. The brake fluid expelled from the outlet chamber 40 on the forward movement of the piston 38 flows through the wheel cylinder connection 50 to the connected wheel cylinders without being hindered by the throttle member 52.

If the pressure in the main cylinder and thus in the inlet chamber 30 continues to increase so strongly, the piston 38 finally moves so far to the front that the valve member 32 can no longer follow it as it is held back by the shoulder 34. Thus, the valve seat 44 detaches itself from the valve member 32 so that the brake fluid can once again flow through the canal 42 and strikes the central area of the throttle member 52 as a more or less strong jet. This causes the throttle member 52 to be pressed against the front end wall 16 so that the brake fluid can only arrive at the wheel cylinder connection 50 from between the front projections 54 of the throttle member 52. The throttle effect this causes prevents the pressure in the connected wheel cylinders from rising too suddenly.

This also applies when braking is initiated abruptly by forceful pressure on the pedal and the pressure in the inlet chamber 30 as a result increases so suddenly that the brake fluid streams through the canal 42 at great speed, the flow forces tending to move the piston 38 intermittently in forward direction without allowing the relatively slow valve member 32 any time to join up with the valve seat 44. The throttle member 52 comes into operation here too as it is carried forward by the flowing brake fluid and, as shown in FIG. 2, its front projections 54 are pressed against the front end wall 16 of the housing 10.

The construction of the throttle member 52 as circular disc and the cresent shape of the gap conditioned thereby, said gap remaining free in every position of the throttle member predominantly between its upper edge and the upper wall of the front bore portion 14, also has the advantage that the brake fluid flows substantially around the top of the throttle member 52 and thus carries with it air which might have accumulated at the top in the angle between the end wall 16 and the wall of the front bore portion 14. In this way, an air cushion is prevented from forming inside the pressure regulating valve described.

Figure 4:
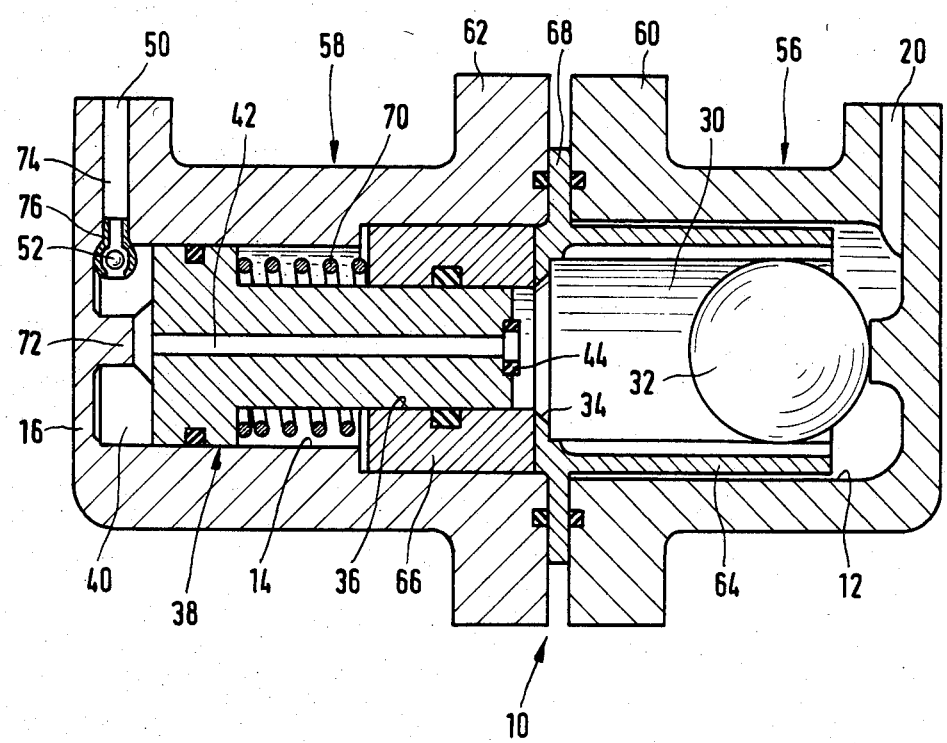
FIG. 4 is an axial section through a second pressure regulating valve in inoperative position.

The pressure regulating valve shown in FIG. 4 has been developed directly from the example of embodiment of DE No. 22 13 463 C3 mentioned at the beginning; however, comparable components have been given the same reference numbers as in FIGS. 1 to 3.

According to FIG. 4, the housing 10 of the pressure regulating valve is composed of two approximately equal housing parts 56 and 58 which have flanges 60 and 62 screwed together. The one-pieced insert 22 in FIGS. 1 to 3 is replaced by two insert portions 64 and 66 arranged axially in tandem; the insert portion 64 has a flange 68 which is held between the flanges 60 and 62.

The piston 38 is biased in forward direction by a compression spring 70 so that in the inoperative position, it abuts a front stop 72 which leaves the canal 42 free. In this position, the valve seat 44 cannot be reached by the valve member 32. However, when the pressure in the chambers 30 and 40 has reached a certain level on actuation of the brakes, the piston 38 moves in rearward direction into a position in which the valve member 32 can join up with the valve seat 44 when the vehicle has achieved a certain deceleration.

The outlet chamber 40 is connected with the wheel cylinder connection 50 by a bore 74 which, in installation position of the pressure regulating valve is at least approximately vertical. In bore 74, a cage 76 is secured which receives a throttle member 52 in the form of a sphere. The throttle member 52 is small in comparison to the spherical valve member 32 and is received in the cage 76 with clearance such that it can be taken along by the flowing brake fluid from the lower end position shown into an upper end position.

In the lower end position, which is determined by a lower inwardly curved edge of the cage 76, the throttle member 52 does not significantly hinder the flow of brake fluid. In the upper end position, however, which is determined by a collar portion of the cage 76 pressed into the bore 74, the throttle member 52 forms a considerable obstacle to flow without completely blocking the entry of the brake fluid into the bore 74.

What is claimed is:

1. A pressure regulating valve for an hydraulic vehicle braking system, comprising
   a housing (10) which has a main cylinder connection (20) and an inlet chamber (30) connected therewith, as well as a wheel cylinder connection (50) and an outlet chamber (40) connected therewith,
   a piston (38) which is arranged between the two chambers (30,40) and normally leaves open a connection between them, and
   a valve member (32) which is adapted to be moved when a certain deceleration force acting upon it is exceeded into a closed position in which it interrupts the connection between the two chambers (30,40),
   whereupon, when pressure in the inlet chamber (30) continues to increase, the piston (38) enlarges said inlet chamber (30) at the expense of the outlet chamber (40), wherein a throttle member (52) is arranged in the outlet chamber (40) and normally leaves open the wheel cylinder connection (50) but is adapted to be moved by the flowing brake fluid on sudden brake actuation into a position in which it partially covers the wheel cylinder connection (50).

2. The pressure regulating valve according to claim 1, wherein the throttle member (52) is arranged such that its weight tends to hold it in its normal position in which it leaves the wheel cylinder connection (50) open.

3. The pressure regulating valve according to claim 1 or 2, wherein the throttle member (52) is an essentially circular disc whose diameter (d) is smaller than the diameter (D) of the outlet chamber (40), but greater than the greatest axial length (L) of said outlet chamber.

4. The pressure regulating valve according to claim 3, wherein the throttle member (52) has projections (54) which prevent it from sealingly abutting the housing (10) or the piston (38).

5. The pressure regulating valve according to claim 1 or 2, wherein the throttle member (52) is a small sphere which is received in a cage (76) in front of the wheel cylinder connection (50).

6. A pressure regulating valve for an hydraulic vehicle braking system, comprising
   a housing (10) which has a main cylinder connection (20) and an inlet chamber (30) connected therewith, as well as a wheel cylinder connection (50) and an outlet chamber (40) connected therewith,
   a piston (38) which is arranged between the two chambers (30, 40) and normally leaves open a connection between them,
   a valve member (32) which is adapted to be moved when a certain deceleration force acting upon it is exceeded into a closed position in which it interrupts the connection between the two chambers (30, 40),
   whereupon, when pressure in the inlet chamber (30) continues to increase, the piston (38) enlarges said inlet chamber (30) at the expense of the outlet chamber (40), a throttle member (52) located in the outlet chamber (40) normally leaving open the wheel cylinder connection (50) but being adapted to be moved by the flowing brake fluid on sudden brake actuation into a position in which it partially covers the wheel cylinder connection (50), said throttle member comprising an essentially circular disc whose diameter (d) is smaller than the diameter (D) of the outlet chamber (40), but greater than the greatest axial length (L) of said outlet chamber, and projection means (54) interposed between said disc and said housing and piston to prevent said disc from sealingly abutting said housing (10) or piston (38).

7. The pressure regulating valve according to claim 6 wherein the throttle member (52) is arranged such that its weight tends to hold it in its normal position in which it leaves the wheel cylinder connection (50) open.

8. The pressure regulating valve according to claims 6 or 7 wherein said projection means comprise projections (54) which are carried by said disc.

* * * * *